US012404704B2

(12) United States Patent
Wagner et al.

(10) Patent No.: US 12,404,704 B2
(45) Date of Patent: Sep. 2, 2025

(54) DOOR HANDLE LOCATOR SYSTEM FOR A VEHICLE

(71) Applicant: GM Global Technology Operations LLC, Detroit, MI (US)

(72) Inventors: Hannah Elizabeth Wagner, Berkley, MI (US); Jacob Alan Bond, Rochester Hills, MI (US); Joseph F. Szczerba, Grand Blanc, MI (US); Akilesh Rajavenkatanarayanan, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 18/358,374

(22) Filed: Jul. 25, 2023

(65) Prior Publication Data

US 2025/0034916 A1 Jan. 30, 2025

(51) Int. Cl.
*E05B 81/76* (2014.01)
*E05B 77/00* (2014.01)
*E05B 85/10* (2014.01)

(52) U.S. Cl.
CPC .............. *E05B 81/76* (2013.01); *E05B 77/00* (2013.01); *E05B 85/103* (2013.01); *E05B 85/107* (2013.01)

(58) Field of Classification Search
CPC ........ E05B 81/76; E05B 77/00; E05B 85/103; E05B 85/107
See application file for complete search history.

(56) References Cited

U.S. PATENT DOCUMENTS

| | | | | |
|---|---|---|---|---|
| 10,233,679 | B1 * | 3/2019 | Chan | B60Q 9/006 |
| 10,384,600 | B1 | 8/2019 | Lenneman et al. | |
| 10,589,672 | B1 * | 3/2020 | Chakrapani | E05B 81/77 |
| 11,210,877 | B1 * | 12/2021 | Amadi | G07C 9/00309 |
| 2017/0254646 | A1 * | 9/2017 | Lee | H04W 4/02 |
| 2018/0124515 | A1 * | 5/2018 | Lopez | G06F 3/165 |
| 2020/0300027 | A1 * | 9/2020 | Brown | B60N 2/0028 |
| 2023/0128104 | A1 * | 4/2023 | Nice | B60Q 9/008 340/686.1 |
| 2023/0258030 | A1 * | 8/2023 | Herman | B60R 25/23 292/336.3 |
| 2024/0026724 | A1 * | 1/2024 | Ravichandran | E05F 15/76 |

* cited by examiner

*Primary Examiner* — Mohamed Barakat
(74) *Attorney, Agent, or Firm* — Vivacqua Crane, PLLC

(57) ABSTRACT

A door handle locator system for a vehicle includes one or more modalities that provide sensory feedback to a user indicating a location of a door handle that is part of a door of the vehicle. The door handle locator system also includes one or more controllers in electronic communication with the one or more modalities. The one or more controllers execute instructions to receive a wireless signal indicating a location of the user with respect to the vehicle. The one or more controllers determine the user is approaching the vehicle based on the location of the user with respect to the vehicle. In response to determining the user is approaching the vehicle, the one or more controllers instruct the one or more modalities to provide the sensory feedback to the user indicating the location of the door handle.

19 Claims, 5 Drawing Sheets

DOOR HANDLE LOCATOR SYSTEM FOR A VEHICLE

INTRODUCTION

The present disclosure relates to a door handle locator system for a vehicle that includes one or more modalities that provide sensory feedback to a user indicating the location of a door handle of the vehicle.

An individual may actuate a door handle to gain entry or to exit a vehicle. Vehicles include interior door handles that allow passengers to exit the vehicle as well as exterior door handles that allow individuals to gain access to the interior cabin of the vehicle. Some individuals may find it challenging to locate the door handles during low-light conditions such as, for example, at dusk or night. It is to be appreciated that individuals who are visually impaired may have an especially difficult time locating the door handle of a vehicle during low-light conditions because of their limited vision capabilities. Moreover, it is also to be appreciated that the door handles of a vehicle are designed to blend in with the vehicle for aesthetic purposes, which exacerbates the issues individuals may have with locating the door handles during low-light conditions.

Thus, while door handles for vehicles achieve their intended purpose, there is a need in the art for an approach to assist an individual with locating a door handle.

SUMMARY

According to several aspects, a door handle locator system for a vehicle, where the vehicle includes a door having a door handle. The door handle locator system includes one or more modalities that provide sensory feedback to a user indicating a location of the door handle, and one or more controllers in electronic communication with the one or more modalities. The one or more controllers execute instructions to receive a wireless signal indicating a location of the user with respect to the vehicle. The one or more controllers execute instructions to determine the user is approaching the vehicle based on the location of the user with respect to the vehicle. In response to determining the user is approaching the vehicle, the one or more controllers instruct the one or more modalities to provide the sensory feedback to the user indicating the location of the door handle.

In another aspect, the one or more modalities include one or more haptic mechanisms that generate haptic feedback.

In yet another aspect, the one or more haptic mechanisms create a vibration pattern that includes a plurality of individual vibrations that are dissipated throughout a body of the door, where the user locates the door handle based on an intensity of the individual vibrations.

In an aspect, the one or more haptic mechanisms are located within a body of the door.

In another aspect, the one or more haptic mechanisms are positioned within the door handle.

In another aspect, the one or more controllers modulate at least one of the following: an intensity, a length, and a pitch of the haptic feedback to convey information regarding one or more of the following: the door handle, the door opened by the door handle, and an interior seat of the vehicle that corresponds to the door opened by the door handle.

In yet another aspect, the one or more modalities include one or more light-emitting elements that emit visible light.

In an aspect, the one or more controllers modulate at least one of the following: an intensity and color of the visible light to convey information regarding one or more of the following: the door handle, the door opened by the door handle, and an interior seat of the vehicle that corresponds to the door opened by the door handle.

In another aspect, the one or more controllers instruct the one or more light-emitting elements to create animation to indicate one or more of the following; a specific location of the door handle relative to the door, a door status of the door opened by the door handle, and an occupancy status of an interior seat that corresponds to the door.

In yet another aspect, the one or more modalities include one or more speakers that generate sound that is audible to humans.

In an aspect, the one or more controllers modulate at least one of the following: a frequency and an intensity of the sound emitted by the one or more speakers to guide the user towards the door handle.

In another aspect, the sound emitted by the one or more speakers includes voice instructions.

In yet another aspect, the one or more modalities include one or more actuation elements that actuate the door handle between a retracted position and a deployed position.

In an aspect, the one or more controllers instruct the one or more actuation elements to rotate the door handle from the retracted position to the deployed position in response to determining the user is approaching the vehicle.

In another aspect, a distal end of the door handle projects outwards relative to an outer surface of the door when the door handle is in the deployed position.

In yet another aspect, the one or more modalities include one or more electromagnets that create a magnetic field when provided with an electric current.

In an aspect, the user wears a complimentary magnet that includes a polarity that is opposite of a polarity of the one or more electromagnets.

In another aspect, a magnetic force is created as the one or more electromagnets attract the complimentary magnet, and wherein the magnetic force is of a magnitude sufficient to urge a hand of the user towards the door handle of the vehicle.

In yet another aspect, a method for indicating a location of a door handle for a vehicle by a door handle locator system. The method includes receiving, by one or more controllers, a wireless signal indicating a location of a user with respect to the vehicle. The method includes determining, by the one or more controllers, a user is approaching the vehicle based on the location of the user with respect to the vehicle. In response to determining the user is approaching the vehicle, the method includes instructing one or more modalities to provide sensory feedback to the user indicating the location of the door handle.

In an aspect, a door handle locator system for a vehicle, where the vehicle includes a door having a door handle. The door handle locator system includes one or more modalities that provide sensory feedback to a user indicating a location of the door handle, where the one or more modalities include one or more of the following: one or more haptic mechanisms, one or more light-emitting elements, one or more speakers, one or more actuation elements, and one or more electromagnets. The door handle locator system includes one or more controllers in electronic communication with the one or more modalities. The one or more controllers execute instructions to receive a wireless signal indicating a location of the user with respect to the vehicle, determine the user is approaching the vehicle based on the location of the user with respect to the vehicle, and in response to determining the user is approaching the vehicle, instruct the one or more modalities to provide the sensory feedback to the user indicating the location of the door handle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
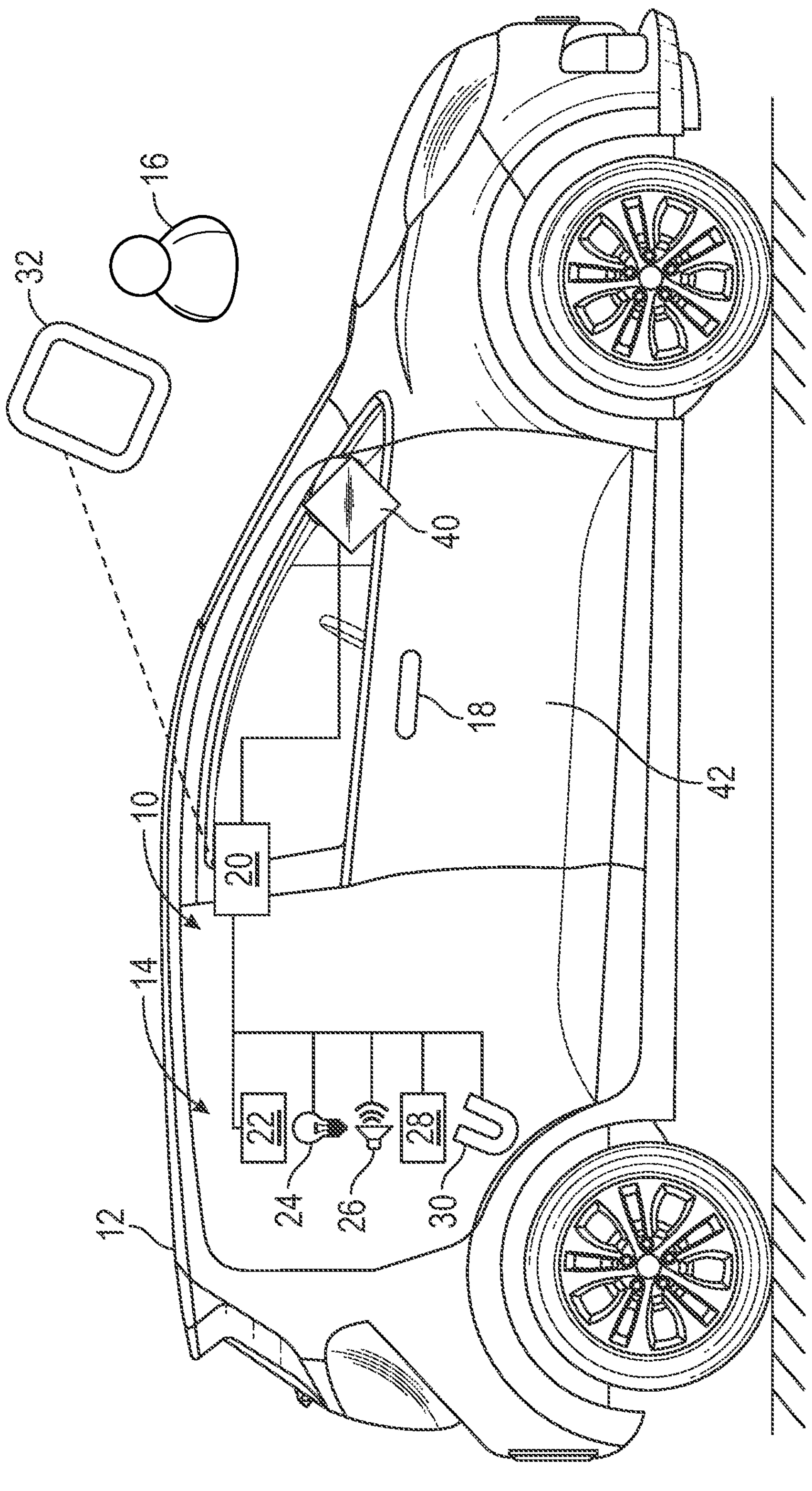
FIG. 1 is a schematic diagram of a vehicle including the disclosed door handle locator system including one or more controllers in electronic communication with one or more modalities that provide sensory feedback to a user indicating the location of a door handle, according to an exemplary embodiment.

Referring to FIG. 1, a schematic diagram of an exemplary door handle locator system 10 for a vehicle 12 is illustrated. It is to be appreciated that the vehicle 12 may be any type of vehicle such as, but not limited to, a sedan, truck, sport utility vehicle, van, or motor home. As explained below, the door handle locator system 10 includes one or more modalities 14 that provide sensory feedback to a user 16 indicating the location of a door handle 18 that is part of the vehicle 12 when activated. The door handle locator system 10 includes one or more controllers 20 that are in electronic communication with the one or more modalities 14 and one or more door handles 18. In the non-limiting embodiment as shown in FIG. 1, the one or more modalities 14 include one or more of the following: one or more haptic mechanisms 22, one or more light-emitting elements 24, one or more speakers 26, one or more actuation elements 28, and one or more electromagnets 30. It is to be appreciated that although only a single door handle 18 is illustrated in FIG. 1, this is merely for purposes of simplicity and clarity, and each door 42 that is part of the vehicle 12 includes an interior door handle as well as an exterior door handle.

The one or more controllers 20 of the door handle locator system 10 is in wireless communication with a personal electronic device 32, where the personal electronic device 32 transmits a wireless signal to the one or more controllers 20 indicating a location of the user 16 with respect to the vehicle 12. The one or more controllers 20 determine when the user 16 is approaching the vehicle 12 based on the location of the user 16 with respect to the vehicle 12. For example, when the location of the user 16 is within a predefined distance from the vehicle 12, the one or more controllers 20 determine the user 16 is approaching the vehicle 12. In response to determining the user 16 is approaching the vehicle 12, the one or more controllers 20 instruct the one or more modalities 14 to provide the sensory feedback to the user 16 indicating the location of the door handle 18. The personal electronic device 32 is any type of electronic device having wireless communication capabilities that is portable so an individual may carry the personal electronic device 32 on his or her person. Some examples of the personal electronic device 32 include, but are not limited to, a key fob, a smartphone, and a smartwatch.

In the event the door handle locator system 10 includes more than one modality 14, in one embodiment the user 16 may choose which modalities 14 are activated to indicate the location of the door handle 18. The user 16 may activate the modalities 14 by entering user input into an interface 40 that is part of the vehicle 12 or, alternatively, by the personal electronic device 32. The interface 40 is any type of user interface that receives and processes user input such as, for example, an infotainment system. For example, if the personal electronic device 32 is a smartphone, then the user 16 may enter user input into the smartphone that activates the one or more light-emitting elements 24 as the modality 14 that is activated to indicate the location of the door handle 18.

In one embodiment, the user 16 enters input into either the personal electronic device 32 or the user interface 40 to customize the generate sensory feedback generated by the one or more modalities 14. Specifically, the sensory feedback may be customized to only allow for specific modalities 14 corresponding to one or more of the door handles 18 that are part of the vehicle 12 to activate. For example, in one embodiment, the vehicle 12 is a ride-share vehicle. In this example, the haptic feedback is customized to allow for only the modalities 14 corresponding to the door handles 18 that provide access to the back seats of the vehicle 12 to activate, since ride-share passengers do not typically ride in the front seats of the vehicle 12.

Figure 2A:
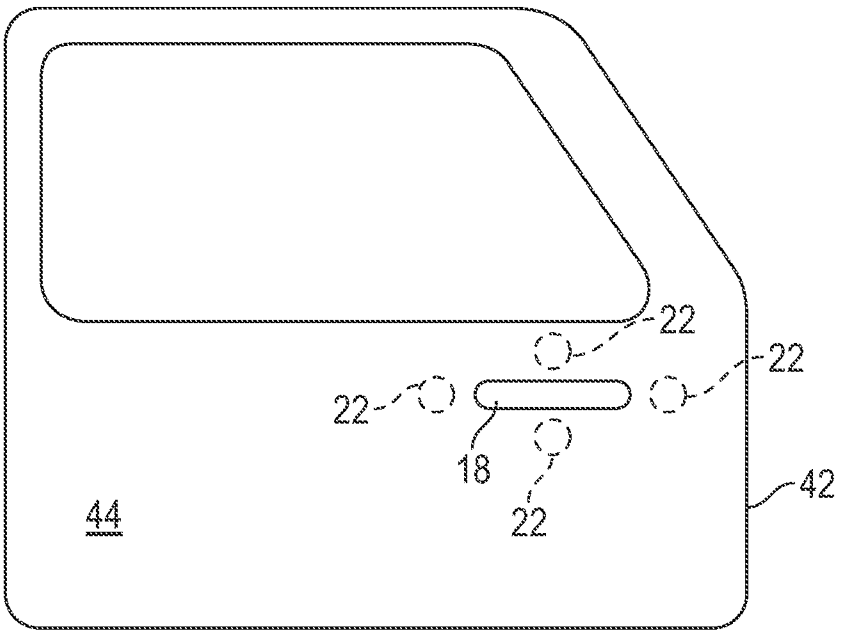
FIG. 2A illustrates one of the doors of the vehicle including one or more haptic mechanisms as the modality, according to an exemplary embodiment.

FIG. 2A illustrates the one or more haptic mechanisms 22 shown in FIG. 1 for an exterior door handle 18 that is disposed along an exterior door 42 of the vehicle 12. It is to be appreciated that while the figures illustrate the door handle 18 located on an exterior door 42 of the vehicle 12, in another embodiment the door handle 18 may be an interior door handle located within the interior cabin of the vehicle 12 as well. In the example as shown in FIG. 2A, the one or more haptic mechanisms 22 are illustrated in phantom line and are located within the body 44 of the door 42 and surround the door handle 18. However, it is to be appreciated that in another embodiment the one or more haptic mechanisms 22 may be positioned within the door handle 18. The one or more haptic mechanisms 22 include any device that generates haptic feedback such as, for example, eccentric rotating mass actuators.

Figure 2B:
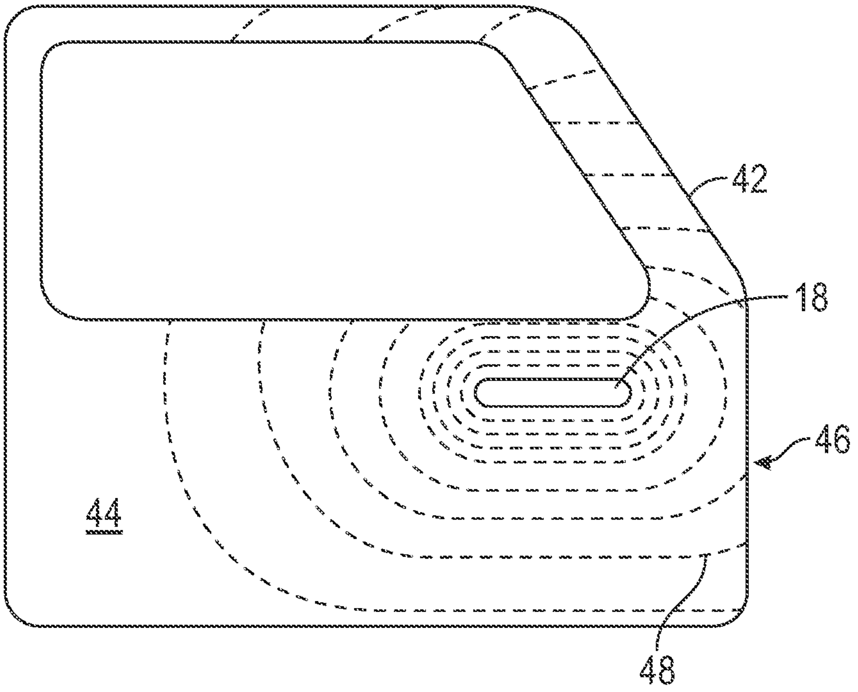
FIG. 2B illustrates a vibrational pattern that is created along the door of the vehicle by the haptic mechanism shown in FIG. 2A, according to an exemplary embodiment.

Referring to both FIGS. 2A and 2B, in response to determining the user 16 is approaching the vehicle 12, the one or more controllers 20 (FIG. 1) instruct the one or more haptic mechanisms 22 to generate the sensor feedback, which is the haptic feedback. The haptic feedback creates a vibration pattern 46 that includes a plurality of individual vibrations 48 that dissipate throughout the body 44 of the door 42. As seen in FIG. 2B, the individual vibrations 48 that are included as part of the vibration pattern 46 are stronger in intensity when proximate to the door handle 18, where the intensity of the vibrations 48 gradually dissipates as the vibrations 48 travel throughout the body 44 of the door 42. Therefore, the user 16 (FIG. 1) locates the door handle 18 based on the intensity of the individual vibrations 48 created by the one or more haptic mechanisms 22.

In one embodiment, an intensity, a length, a pitch, or a combination of intensity, length, or pitch of the haptic feedback generated by the one or more haptic mechanisms 22 is modulated to convey information regarding one or more of the following: the door handle 18, the door 42 that is opened by the door handle 18, and an interior seat of the vehicle 12 that corresponds to the door 42 that is opened by the door handle 18. Specifically, in one embodiment, one or more of the intensity, the length, and the pitch of the haptic feedback is modulated to indicate a specific location of the door handle 18 relative to the door 42, a door status of the door 42 that is opened by the door handle 18, and an occupancy status of the interior seat that corresponds to the door 42. The door status indicates if the door 42 is locked or unlocked, and the occupancy status indicates when a passenger is occupying a particular seat. For example, in one embodiment, the one or more haptic mechanisms 22 are modulated to generate repeated vibration patterns to indicate the specific location of the door handle 18 relative to the door 42. As another example, the one or more haptic mechanisms 22 are modulated to generate three higher-pitched vibrations to indicate a seat is occupied.

Figure 3A:
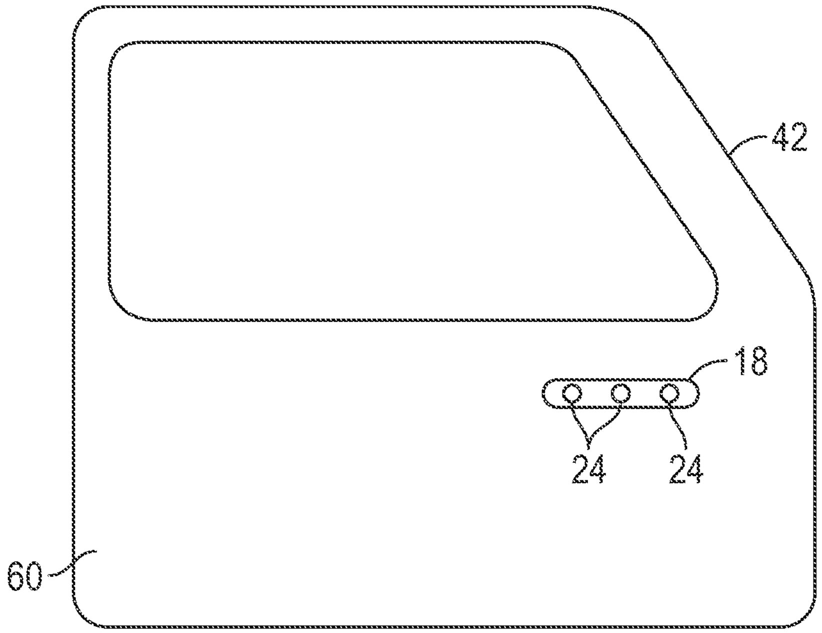
FIG. 3A illustrates one of the doors of the vehicle including one or more light-emitting elements placed within the door handle as the modality, according to an exemplary embodiment.
Figure 3B:
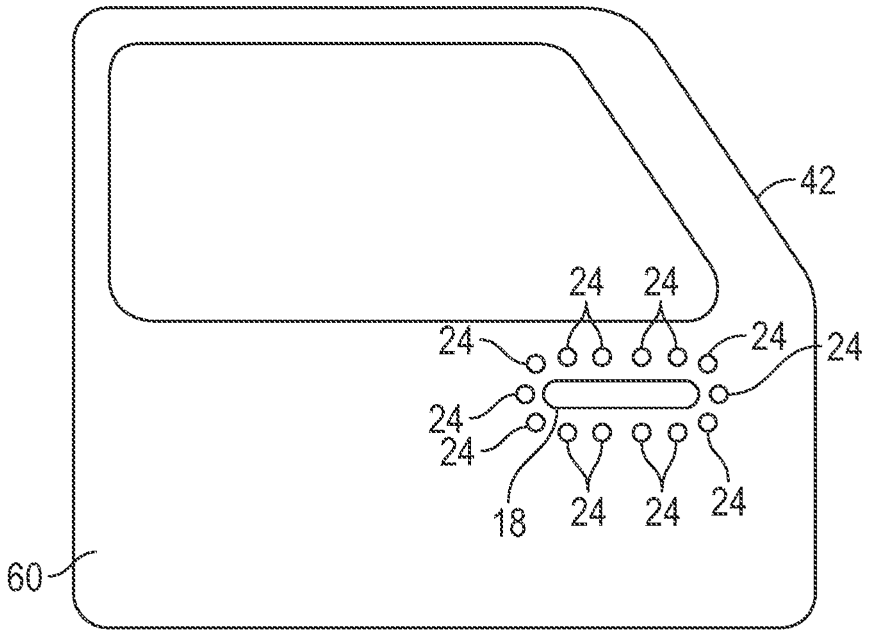
FIG. 3B illustrates one of the doors of the vehicle including one or more light-emitting elements placed around the door handle as the modality, according to an exemplary embodiment.

FIG. 3A illustrates the one or more light-emitting elements 24 shown in FIG. 1 for the door handle 18. In the embodiment as shown in FIG. 3A, the light emitting-elements 24 are placed within the door handle 18. Alternatively, in the embodiment as shown in FIG. 3B the light emitting elements 24 are located along an outer surface 60 of the door 42 and are positioned around the door handle 18. The one or more light-emitting elements 24 include any device that generates visible light such as, for example, light-emitting diodes (LEDs). Referring to FIGS. 3A and 3B, in response to determining the user 16 is approaching the vehicle 12, the one or more controllers 20 (FIG. 1) instruct the one or more light-emitting elements 24 to generate visible light. The visible light provides illumination and guides the hand of the user 16 towards the door handle 18. In embodiments, the visible light is white light, however, it is to be appreciated that any other colored light may be used as well such as, for example, red light, blue light, or green light.

In one embodiment, the one or more controllers 20 (FIG. 1) modulate the visible light emitted by the one or more light-emitting elements 24 to convey information regarding one or more of the following: the door handle 18, the door 42 that is opened by the door handle 18, and an interior seat of the vehicle 12 that corresponds to the door 42 that is opened by the door handle 18. Specifically, in one embodiment, the one or more controllers 20 modulate the color, the intensity, or both the color and the intensity of the visible light to indicate a specific location of the door handle 18 relative to the door 42, a door status of the door 42 that is opened by the door handle 18, and an occupancy status of the interior seat that corresponds to the door 42. For example, in one embodiment, to indicate the door status, the one or more controllers 20 may instruct the light-emitting elements 24 generate blue light to indicate when the door 42 is unlocked, and white light to indicate when the door 42 is locked. In another example, the one or more controllers 20 instruct the light-emitting elements 24 to flash or illuminate to guide the user 16 towards a specific door handle 18 that corresponds to one of the doors 42 that are part of the vehicle 12.

In one embodiment, the one or more controllers 20 instruct the one or more light-emitting elements 24 to create animation to indicate a specific location of the door handle 18 relative to the door 42, a door status of the door 42 that is opened by the door handle 18, and an occupancy status of the interior seat that corresponds to the door 42. It is to be appreciated that the light-emitting elements 24 animate by dynamically blinking, flashing, changing color, and changing intensity. For example, if a seat corresponding to one of the door handles 18 is occupied, then the one or more controllers 20 may instruct the light-emitting elements 24 to generate relatively short flashes of blue and white light to indicate the corresponding seat is occupied. In one embodiment, the color, the intensity, and the animation of the visible light emitted by the one or more light-emitting elements 24 is specifically customized to attract the attention of a guide dog or other service animal.

Referring to FIG. 1, in an embodiment the one or more modalities 14 include the one or more speakers 26. The one or more speakers 26 may be positioned within the body 44 of one of the doors 42 (FIGS. 2A and 2B) in an area directly behind the door handle 18. In response to determining the user 16 is approaching the vehicle 12, the one or more controllers 20 (FIG. 1) instruct the one or more speakers 26 to generate sound that is audible to humans. The sound guides the user 16 towards the door handle 18. Specifically, in one embodiment, the one or more controllers 20 may guide the user 16 towards the door handle 18 by modulating the frequency, the intensity, or both the frequency and the intensity of the sound emitted by the one or more speakers 26. In another embodiment, the sound emitted by the one or more controllers 20 includes voice instructions, where the voice instructions guide the user 16 towards the door handle 18.

In one embodiment, the one or more controllers 20 instruct the sound emitted by the one or more speakers 26 to convey information regarding one or more of the following: the door handle 18, the door 42 that is opened by the door handle 18, and an interior seat of the vehicle 12 that corresponds to the door 42 (FIG. 2A) that is opened by the door handle 18. In one embodiment, the one or more controllers 20 instruct the sound to indicate a door status of the door 42 that is opened by the door handle 18 or an occupancy status of the interior seat that corresponds to the door 42. For example, voice instructions are used to indicate when a seat is occupied, such as voice instructions that state "seat is occupied, find another door". As another example, an audio chime or voice instructions may be used to indicate when the door is locked, such as a voice instruction that states "the door is locked" or "the door is unlocked". In another example, the one or more controllers 20 instruct the sound emitted by the speaker 26 to guide the user 16 towards a specific door handle 18 that corresponds to one of the doors 42 that are part of the vehicle 12. For example, the voice instructions may state "incorrect door" if the user 16 attempts to open the passenger side door when the user 16 is hailing a ride-share vehicle that seats the user 16 in the back seat.

Figure 4A:
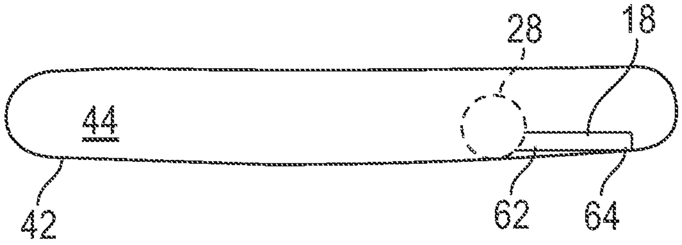
FIG. 4A is a top view of one of the doors of the vehicle including one or more actuation elements as the modality, where the one or more actuation elements are in a retracted position, according to an exemplary embodiment.
Figure 4B:
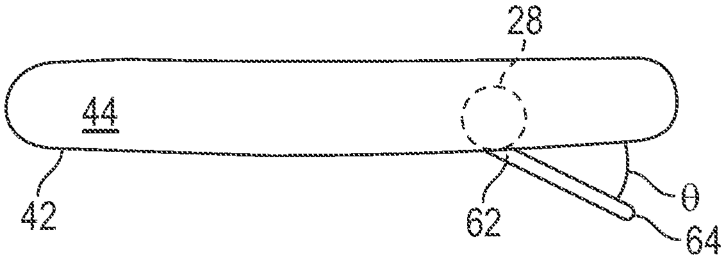
FIG. 4B is a top view of one of the doors of the vehicle including one or more actuation elements as the modality, where the one or more actuation elements are in a retracted position, according to an exemplary embodiment.

FIGS. 4A and 4B illustrate a top view of the door 42 of the vehicle 12 including the one or more actuation elements 28. Specifically, FIG. 4A illustrates the door handle 18 in a retracted position and FIG. 4B illustrates the door handle 18 in a deployed position, where the one or more actuation elements 28 actuate the door handle 18 between the retracted position and the deployed position. The one or more actuation elements 28 are any device that actuates the door handle 18 between the retracted position and the deployed position such as, but not limited to, an electric motor. The one or more actuation elements 28 are positioned within the body 44 of the door 42 and are operatively connected to a proximate end 62 of the door handle 18.

The door handle 18 is normally in the retracted position as seen in FIG. 4A, where the proximate end 62 and a distal end 64 of the door handle 18 are positioned flush with the outer surface 60 of the door 42. In response to determining the user 16 is approaching the vehicle 12, the one or more controllers 20 (FIG. 1) instruct the one or more actuation elements 28 to rotate the door handle 18 from the retracted position as shown in FIG. 4A to the deployed position shown in FIG. 4B. When in the deployed position, the distal end 64 of the door handle 18 projects outwards relative to the outer surface 60 of the door 42 at an angle θ, thereby making the door handle 18 more prominent when compared to the retracted position. Accordingly, the user 16 (FIG. 1) more easily views the door handle 18 when in the deployed position. In addition to making the door handle 18 more prominent, the door handle 18 is also easier for the user 16 to grasp as well, which may be especially advantageous for individuals who have issues with grasping or manipulating objects.

Figure 5:
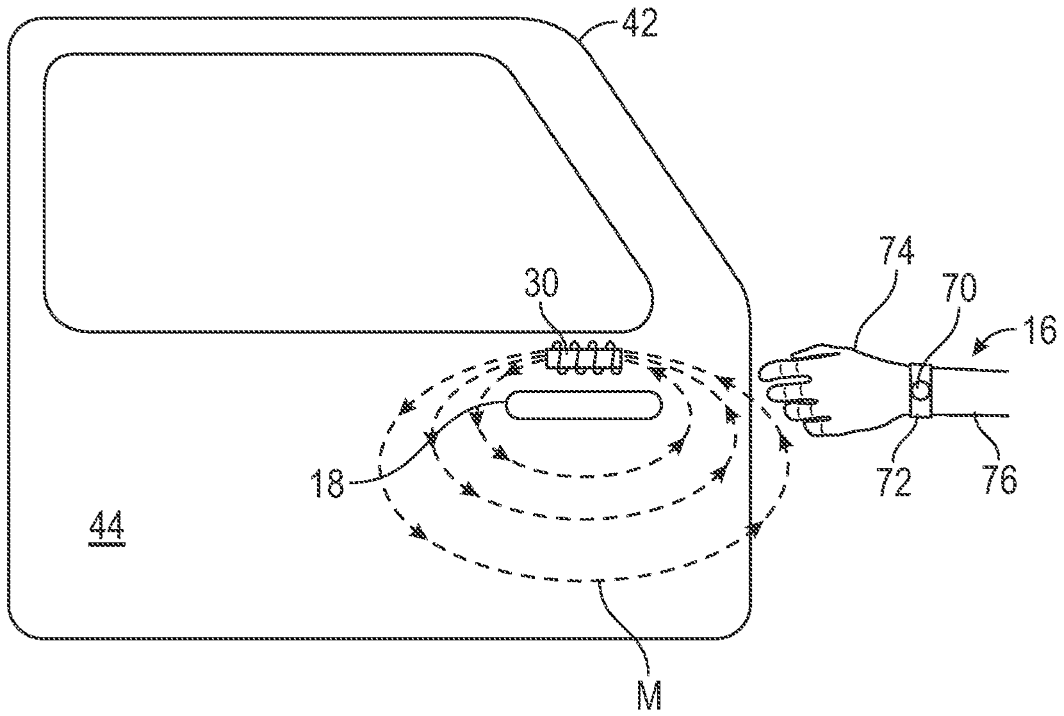
FIG. 5 illustrates one of the doors of the vehicle including one or more electromagnets as the modality, according to an exemplary embodiment.

FIG. 5 illustrates the one or more electromagnets 30 shown in FIG. 1 as the one or more modalities 14 for the door handle 18. In the embodiment as shown in FIG. 5, the one or more electromagnets 30 are placed within the body 44 of the door 42 directly adject to the door handle 18, however, it is to be appreciated in alternative embodiments the electromagnets 30 may be placed within the door handle 18 as well. Referring to FIGS. 1 and 5, in response to determining the user 16 is approaching the vehicle 12, the one or more controllers 20 activate the one or more electromagnets 30 by providing an electric current to the one or more electromagnets 30 to create a magnetic field M.

As seen in FIG. 5, the user 16 wears a complimentary magnet 70. The magnet 70 worn by the user 16 has a polarity that is opposite of the polarity of the one or more electromagnets 30 of the vehicle 12. The complimentary magnet 70 is part of an accessory 72 worn on a hand 74 or forearm 76 of the user 16. The accessory 72 may be a piece of jewelry such as, for example, a ring, bracelet, or watch band. Therefore, when the one or more electromagnets 30 are activated and the complimentary magnet 70 worn by the user 16 enters the magnetic field M, a magnetic force is created as the one or more electromagnets 30 attract the complimentary magnet 70 worn by the user 16. The magnetic force is of a magnitude sufficient to urge the hand 74 of the user 16 in the direction towards the door handle 18 of the vehicle 12. That is, in other words, the magnetic force is of a magnitude strong enough so the user 16 detects a force that is guiding his or her hand 74 towards the door handle 18.

Figure 6:
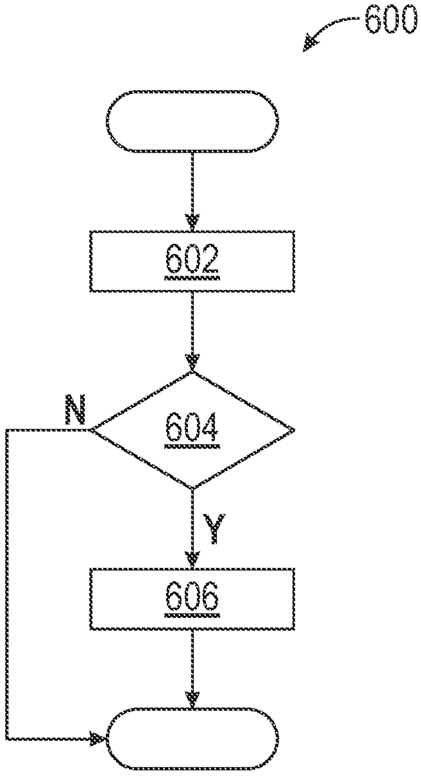
FIG. 6 is a process flow diagram illustrating a method for providing sensory feedback by the door handle locator system indicating the location of the door handle, according to an exemplary embodiment.

FIG. 6 is a process flow diagram illustrating an exemplary method 600 for providing sensory feedback to the user 16 by the door handle locator system 10 indicating the location of the door handle 18 that is part of the vehicle 12. Referring to FIGS. 1 and 6, the method 600 may begin at block 602. In block 602, the one or more controllers 20 receive a wireless signal indicating the location of the user 16 with respect to the vehicle 12 from the personal electronic device 32. The method 600 may then proceed to block 604.

In decision block 604, the one or more controllers 20 determine if the user 16 is approaching the vehicle 12 based on the location of the user 16 with respect to the vehicle 12, which is indicated by the wireless signal. For example, when the location of the user 16 is within a predefined distance from the vehicle 12, the one or more controllers 20 determine the user 16 is approaching the vehicle 12. In response to determining the user 16 is not approaching the vehicle 12, the method 600 terminates. However, in response to determining the user 16 is approaching the vehicle 12, the method 600 proceeds to block 606.

In block 606, in response to determining the user 16 is approaching the vehicle 12, the one or more controllers 20 instruct the one or more modalities 14 to provide the sensory feedback to the user 16 indicating the location of the door handle 18. It is to be appreciated that the user 16 may select which modalities 14 are activated to indicate the location of the door handle 18. The method 600 may then terminate.

Referring generally to the figures, the disclosed door handle locator system provides various technical effects and benefits. Specifically, the disclosed door handle locator system provides an approach for providing sensory feedback indicating a location of the door handle of the vehicle. It is to be appreciated that the sensory feedback provided by the one or more modalities may be especially helpful for individuals who are visually impaired and have an especially difficult time locating the door handle of a vehicle during low-light conditions. In addition to the location of the door handle, the door handle locator system may also provide other information to an individual as well, such as information regarding the door status and the occupancy status of the interior seat that corresponds to the door.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A door handle locator system for a vehicle, wherein the vehicle includes a door having a door handle, the door handle locator system comprising:

one or more modalities that provide sensory feedback to a user indicating a location of the door handle, wherein the one or more modalities include one or more haptic mechanisms that generate haptic feedback, and wherein the one or more haptic mechanisms create a vibration pattern that includes a plurality of individual vibrations that are dissipated throughout a body of the door, and wherein the user locates the door handle based on an intensity of the individual vibrations; and one or more controllers in electronic communication with the one or more modalities, wherein the one or more controllers execute instructions to:

receive a wireless signal indicating a location of the user with respect to the vehicle;

determine the user is approaching the vehicle based on the location of the user with respect to the vehicle; and in response to determining the user is approaching the vehicle, instruct the one or more modalities to provide the sensory feedback to the user indicating the location of the door handle.

2. The door handle locator system of claim 1, wherein the one or more haptic mechanisms are located within a body of the door.

3. The door handle locator system of claim 1, wherein the one or more haptic mechanisms are positioned within the door handle.

4. The door handle locator system of claim 1, wherein the one or more controllers modulate at least one of the following: an intensity, a length, and a pitch of the haptic feedback to convey information regarding one or more of the following: the door handle, the door opened by the door handle, and an interior seat of the vehicle that corresponds to the door opened by the door handle.

5. The door handle locator system of claim 1, wherein the one or more modalities include one or more light-emitting elements that emit visible light.

6. The door handle locator system of claim 5, wherein the one or more controllers modulate at least one of the following: an intensity and color of the visible light to convey information regarding one or more of the following: the door handle, the door opened by the door handle, and an interior seat of the vehicle that corresponds to the door opened by the door handle.

7. The door handle locator system of claim 5, wherein the one or more controllers instruct the one or more light-emitting elements to create animation to indicate one or more of the following; a specific location of the door handle relative to the door, a door status of the door opened by the door handle, and an occupancy status of an interior seat that corresponds to the door.

8. The door handle locator system of claim 1, wherein the one or more modalities include one or more speakers that generate sound that is audible to humans.

9. The door handle locator system of claim 8, wherein the one or more controllers modulate at least one of the following: a frequency and an intensity of the sound emitted by the one or more speakers to guide the user towards the door handle.

10. The door handle locator system of claim 8, wherein the sound emitted by the one or more speakers includes voice instructions.

11. The door handle locator system of claim 1, wherein the one or more modalities include one or more actuation elements that actuate the door handle between a retracted position and a deployed position.

12. The door handle locator system of claim 11, wherein the one or more controllers instruct the one or more actuation elements to rotate the door handle from the retracted position to the deployed position in response to determining the user is approaching the vehicle.

13. The door handle locator system of claim 11, wherein a distal end of the door handle projects outwards relative to an outer surface of the door when the door handle is in the deployed position.

14. The door handle locator system of claim 1, wherein the one or more modalities include one or more electromagnets that create a magnetic field when provided with an electric current.

15. The door handle locator system of claim 14, wherein the user wears a complimentary magnet that includes a polarity that is opposite of a polarity of the one or more electromagnets.

16. The door handle locator system of claim 15, wherein a magnetic force is created as the one or more electromagnets attract the complimentary magnet, and wherein the magnetic force is of a magnitude sufficient to urge a hand of the user towards the door handle of the vehicle.

17. A method for indicating a location of a door handle for a vehicle by a door handle locator system, the method comprising:

receiving, by one or more controllers, a wireless signal indicating a location of a user with respect to the vehicle;

determining, by the one or more controllers, a user is approaching the vehicle based on the location of the user with respect to the vehicle; and in response to determining the user is approaching the vehicle, instruct one or more modalities to provide sensory feedback to the user indicating the location of the door handle, wherein the one or more modalities include one or more haptic mechanisms that generate haptic feedback, and wherein the one or more haptic mechanisms create a vibration pattern that includes a plurality of individual vibrations that are dissipated throughout a body of the door, and wherein the user locates the door handle based on an intensity of the individual vibrations.

18. A door handle locator system for a vehicle, wherein the vehicle includes a door having a door handle, the door handle locator system comprising:

one or more modalities that provide sensory feedback to a user indicating a location of the door handle, wherein the one or more modalities include one or more actuation elements, and one or more electromagnets that create a magnetic field when provided with an electric current, and wherein the user wears a complimentary magnet that includes a polarity that is opposite of a polarity of the one or more electromagnets, and wherein a magnetic force is created as the one or more electromagnets attract the complimentary magnet, and wherein the magnetic force is of a magnitude sufficient to urge a hand of the user towards the door handle of the vehicle; and one or more controllers in electronic communication with the one or more modalities, wherein the one or more controllers execute instructions to:

receive a wireless signal indicating a location of the user with respect to the vehicle;

determine the user is approaching the vehicle based on the location of the user with respect to the vehicle; and in response to determining the user is approaching the vehicle, instruct the one or more modalities to provide the sensory feedback to the user indicating the location of the door handle.

19. The door handle locator system of claim 18, wherein the one or more modalities further include one or more of the following: one or more haptic mechanisms, one or more light-emitting elements, one or more speakers, and one or more actuation elements.

* * * * *